June 30, 1925.
C. N. ADDIS
1,543,812
MEANS FOR TRUING UP CONNECTING RODS, PISTONS, ETC
Filed Sept. 16, 1922
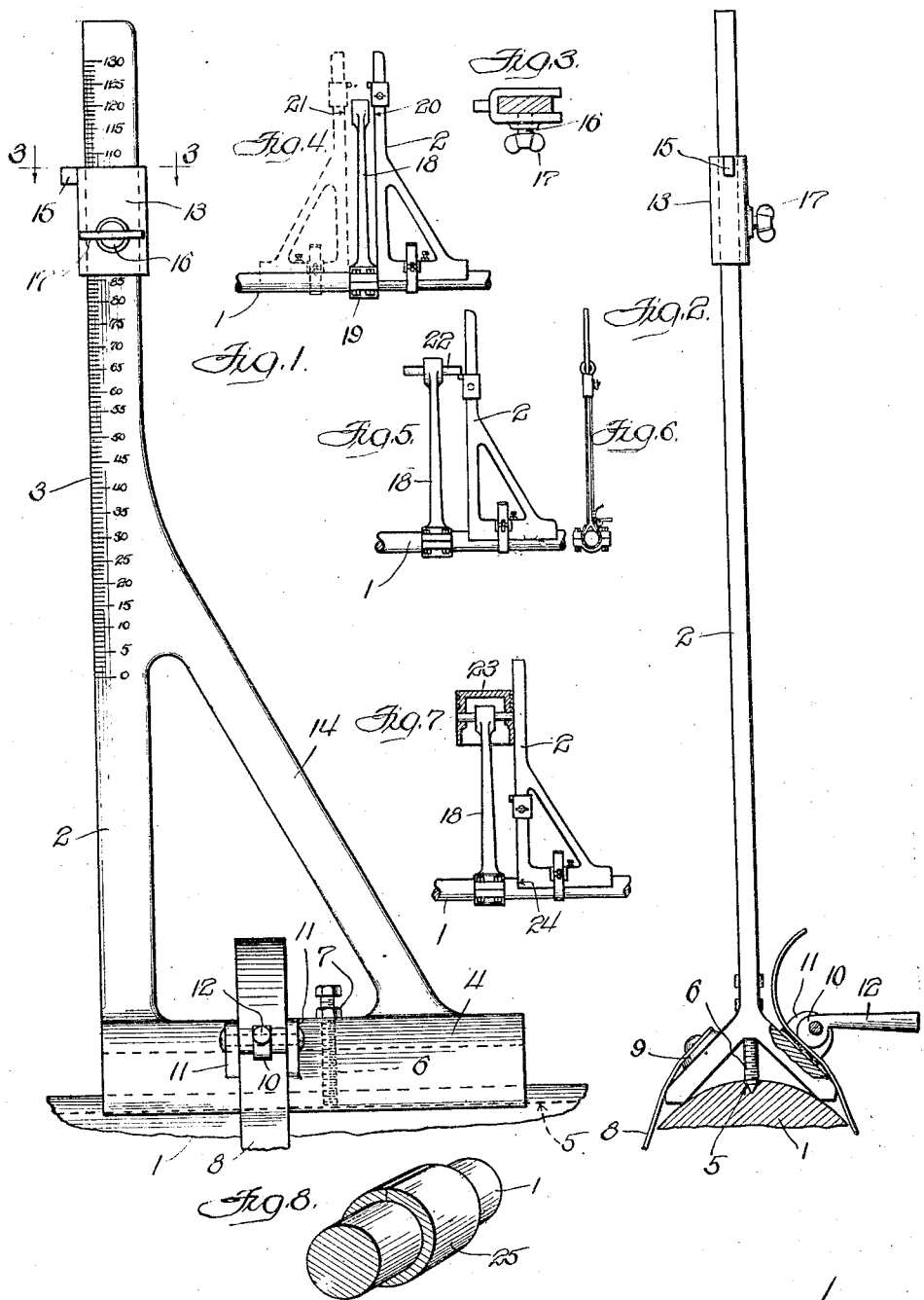
Inventor:
CHARLES N. ADDIS Patented June 30, 1925.

1,543,812

UNITED STATES PATENT OFFICE.

CHARLES N. ADDIS, OF DOWNERS GROVE, ILLINOIS, ASSIGNOR TO PAUL H. APPELL, OF EVANSTON, ILLINOIS.

MEANS FOR TRUING UP CONNECTING RODS, PISTONS, ETC.

Application filed September 16, 1922. Serial No. 588,684.

*To all whom it may concern:*

Be it known that I, CHARLES N. ADDIS, a citizen of the United States, residing at Downers Grove, in the county of Du Page and State of Illinois, have invented certain new and useful Improvements in Means for Truing up Connecting Rods, Pistons, Etc., of which the following is a specification.

My invention has reference more particularly to a gauge or measuring device for testing connecting rods and pistons so as to determine when they are accurately lined up so as to work properly in an engine.

The principal objects of my invention are to provide a device whereby connecting rods and pistons may be trued up so that they will line up properly with the cylinders and crank shafts with which they are designed to operate; to provide means of this character which is simple an inexpensive; and in general, to afford a more convenient method of lining up connecting rods and pistons than heretofore provided.

On the drawings:

Figure 1 is a side view of a gauge constructed in accordance with my invention and mounted on a fragmentary portion of the shaft which supports the connecting rod and other parts as they are tested and trued up;

Fig. 2 a view looking at the left of the device as shown in Fig. 1;

Fig. 3 a sectional view on the line 3—3 of Fig. 1;

Fig. 4 a diagrammatic view showing the manner of truing up the connecting rod;

Fig. 5 a similar view showing the operation of determining the proper location of the wrist pin so that its axis will be parallel with the axis of the crank shaft pin;

Fig. 6 a similar view showing the manner of truing up the wrist pin so that it lies in the same plane as the axis of the crank shaft pin;

Fig. 7 a diagrammatic view showing the operation of lining up the piston so that the walls thereof at the opposite ends of the wrist pin are perpendicular to the axis of the crank shaft pin; and Fig. 8 a perspective view of the shaft of the device showing a bushing which may be applied thereon for adapting same to accommodate bearings of different sizes in connecting rods which are to be tested.

Referring to the drawings, the reference numeral 1 indicates a shaft onto which connecting rods are mounted for testing and adjustment, which is mounted at one end, or both ends if desired, in a suitable support, as for example, a strong vise so that it is maintained rigidly in position to withstand the strains incidental to the bending of the connecting rod which may be required to true it up. A square or gauge 2 is arranged to be mounted on the shaft 1, and preferably provided with graduations 3 along one edge, and this graduated edge is arranged so as to project radially from and at right angles to the axis of the shaft 1 when the square 2 is mounted thereon. To this end the square 2 is formed at the lower end with an elongated V-shaped saddle 4 to engage the shaft 1 at opposite sides of a plane passing through the axis of the shaft 2, the contact portions of the two flanges of the saddle 4 being carefully constructed so that when they rest upon the surface of the shaft 1, the measuring edge of the square 2 will be held exactly in a radial line perpendicular to the axis of the shaft 1.

I have also provided means for placing and holding the gauge or square 2 so that it will lie in a predetermined plane passing through the axis of the shaft 1, this means consisting of a longitudinal V-shaped groove 5 which is cut in the shaft 1 and a pointed set screw 6 which is mounted in the saddle 4 to engage the groove 5. This set screw is adjustable as indicated, so that proper engagement thereof with the groove 5 may be effected, and the clamping nut 7 on the set screw serves to hold the latter locked in adjusted position.

Means may also be provided if desired, for holding the gauge on the shaft 1, as for example, the strap 8 which is secured at one end to a boss 9 on one of the flanges of the saddle 4 and is adapted to have the other end secured by a clamp to the other flange of the saddle. This clamp may consist of an eccentric cam 10 which is pivoted between a pair of bearing lugs 11 on the flange of the saddle 4 and provided with a handle 12 for operating same. With this construction the free end of the band 8 is first inserted between the outer face of the flange of the saddle 4 and the raised eccentric 10 and drawn up tight, after which the handle 12 is depressed so as to clamp the strap in place, For convenience, the gauge 2 may be provided with a slider 13 which is formed in a U-shape as shown in Fig. 3, so as to move lengthwise of the upright arm of the gauge and pass the upper end of the brace 14, and is provided with a projection 15 which may be conveniently used for determining measurements. One arm of the slider is provided with a set screw 16 having preferably a wing shaped grip 17 whereby it may be manipulated for locking the slider on the gauge and releasing same therefrom.

In using this device, the shaft 1 is first fixedly mounted in the proper position, and the connecting rod which is indicated at 18, is clamped thereon, sufficient shims being omitted between the bearing cap 19 and the end of the connecting rod so that it will clamp tightly on the shaft 1. The connecting rod is preferably mounted in an upright position and substantially in the plane of the gauge 2 when the latter is mounted on the shaft 1, and to this end the gauge 2 is preferably used to set up the connecting rod on the shaft.

The gauge 2 is then slid along the shaft 1 until the lower end butts against one end of the lower bearing of the connecting rod, and the distance between the bearing at the upper end and the gauge as indicated at 20 in Fig. 4 is measured, after which the gauge 2 is transferred to the opposite side of the connecting rod and similarly positioned as indicated by dotted lines in Fig. 4 and the corresponding measurement 21 taken. If the measurements 20 and 21 correspond, it shows that the bearing at the upper end of the connecting rod is properly centered, but if the measurements 20 and 21 do not correspond, a wrench or bending tool is used on the connecting rod 18 and the latter bent until the upper end bearing of the connecting rod is properly positioned with respect to the lower end bearing, measurements 20 and 21 being taken from time to time to determine when the proper adjustment of the connecting rod is accomplished.

After the connecting rod has been properly lined up as above stated, the wrist pin 22 is then placed in the upper bearing of the connecting rod as indicated in Fig. 5 and the distance of the opposite ends of the wrist pin from the shaft 1 measured by means of the gauge 2, the operation of the measuring at one end being shown in Fig. 5. If the ends are unequally distant from the shaft 1, a wrench or bending tool is applied to the upper end of the connecting rod and the latter bent so as to make the axis of the wrist pin 22 parallel with the axis of the shaft 1. The opposite ends of the wrist pin are also tested by sighting along the side of the gauge as shown in Fig. 6, to determine whether the axis of the wrist pin 22 is in the same plane as the axis of the shaft 1, and if not, a bending tool is applied to the upper end of the connecting rod 17 and the latter twisted until the wrist pin is properly positioned.

The piston 23 may then be mounted on the wrist pin 22 and the gauge 2 set against the opposite sides thereof as shown in Fig. 7, to determine if the walls of the piston at opposite ends of the wrist pin are exactly at right angles to the axis of the shaft 1, a bending tool being again applied to the connecting rod 18 if necessary, to secure the proper adjustment of the piston. The measurement 24 may also be taken between opposite ends of the lower bearing of the connecting rod and the lower end of the gauge 2 as shown in Fig. 7, to insure proper alignment of the lower bearing of the connecting rod with the piston, bending of the connecting rod 18 being further resorted to if necessary to secure the proper adjustment.

When the measurements above described have been taken and the necessary adjustments made, the piston will be properly centered with relation to the pin on the crank shaft to which the lower end of the connecting rod is subsequently attached and also properly centered and lined up with the cylinder in which it operates.

This device is adapted to measure and adjust connecting rods of various sizes, and in order that the same shaft 1 and gauge may be employed, I propose to employ bushings 25 which may slip onto the shaft 1 to accommodate bearings of different sizes in the various connecting rods which are to be tested and lined up, these bushings being preferably split as indicated, or otherwise constructed, so that the connecting rod will clamp rigidly on the shaft and withstand the bending and twisting strains to which it may be subjected in the operations of straightening up the connecting rod.

While I have shown and described my invention in a preferred form, I am aware that various changes and modifications may be made without departing from the principles of my invention, the scope of which is to be determined by the appended claims.

I claim as my invention:

1. In a device of the class described, the combination of an elongated support adapted to have the end of a connecting rod clamped thereon intermediate of the ends and having coaxial portions of the same cross section at opposite sides of the point of attachment of the connecting rod, and a square having a recessed base for optional mounting on either end of the supporting member, said square being provided with an arm extending upwardly from the base for obtaining corresponding measurements at both sides of the outer end of the connecting rod when the latter is clamped on the support.

2. In a device of the class described, the combination of a shaft of uniform diameter throughout its length which is adapted to have a connecting rod clamped thereon intermediate of its ends, a square having a recessed base for optional mounting on the shaft at either side of the connecting rod and having an arm extending at right angles to the base, and a member adjustable lengthwise of said arm.

3. In a device of the class described, the combination of a shaft having a longitudinal groove in the periphery thereof, a gauge having an elongated saddle adapted to bridge a portion of the periphery of the shaft, a pin projecting from the saddle into the groove of the shaft, and an arm extending outwardly from the saddle at one end thereof.

CHARLES N. ADDIS.